United States Patent [19]

Fasiska

[11] Patent Number: 5,176,421
[45] Date of Patent: Jan. 5, 1993

[54] AUTOMOBILE COVER SYSTEM

[75] Inventor: Edward J. Fasiska, Pittsburgh, Pa.

[73] Assignee: Entretec, Inc., Pittsburgh, Pa.

[21] Appl. No.: 430,486

[22] Filed: Nov. 1, 1989

Related U.S. Application Data

[63] Continuation-in-part of Ser. No. 261,037, Nov. 16, 1988, abandoned, which is a continuation-in-part of Ser. No. 106,816, Oct. 13, 1987, Pat. No. 4,848,823.

[51] Int. Cl.$^5$ ................................. B60J 7/20
[52] U.S. Cl. ........................................ 296/136; 150/166
[58] Field of Search ................. 296/136, 98, 117; 135/88; 150/166

[56] References Cited

U.S. PATENT DOCUMENTS

| | | | |
|---|---|---|---|
| 1,238,642 | 8/1917 | Crump | 160/263 |
| 1,719,055 | 7/1929 | Herzer | 296/136 |
| 1,912,231 | 5/1933 | Wandscheir | 296/136 |
| 1,999,171 | 4/1935 | Bryant | 296/136 |
| 2,688,513 | 9/1954 | Poirier | 296/98 |
| 2,811,321 | 10/1957 | La Barre | 296/98 X |
| 3,222,102 | 12/1965 | Lucas | 296/136 |
| 3,992,053 | 11/1976 | Hrytzak | 296/136 |
| 4,174,134 | 11/1979 | Mathis | 296/136 |
| 4,274,077 | 6/1981 | Feiger | 340/63 |
| 4,324,427 | 4/1982 | Huang et al. | 296/136 |
| 4,432,581 | 2/1984 | Guma | 296/136 |
| 4,519,644 | 5/1985 | Song | 296/136 |
| 4,589,459 | 5/1986 | Lantrip | 296/136 |
| 4,596,418 | 6/1986 | Koh | 296/136 |
| 4,657,298 | 4/1987 | Yong | 135/88 X |
| 4,718,711 | 2/1988 | Rabbit | 296/136 |
| 4,720,135 | 1/1988 | Farina | 296/136 |
| 4,795,207 | 1/1989 | Clarke | 296/136 |
| 4,834,446 | 5/1989 | Tung-Chow | 296/136 |
| 4,848,823 | 7/1989 | Flohr et al. | 296/98 |
| 4,856,842 | 8/1989 | Ross et al. | 296/136 |
| 4,858,985 | 8/1989 | Wojcik | 296/136 |

FOREIGN PATENT DOCUMENTS

| | | | |
|---|---|---|---|
| 3245017 | 6/1984 | Fed. Rep. of Germany | 296/98 |
| 1074987 | 10/1954 | France . | |
| 2524398 | 10/1983 | France . | |
| 811313 | 4/1959 | United Kingdom | 296/98 |

Primary Examiner—Robert R. Song
Attorney, Agent, or Firm—Webb Burden Ziesenheim & Webb

[57] ABSTRACT

A cover system for an automobile includes a flexible cover, preferably of nylon, having leading, trailing and side edge portions and of a suitable dimension to fit over the entire car body from the rear bumper to the front bumper and sides thereof. The flexible cover includes an elastic leader segment attached at a first end to the cover and spaced from the trailing edge thereof. A second end of the leader segment is attached to a rotatable spool housed in a containment tube. The spool is rotated for storing in the cover by a motor, by a spring-biased shaft arrangement or by a manually turnable crank, or combinations thereof. The containment tube may be pivotally mounted by straps within the interior of the trunk for storage therein and is adapted to be pivotally swung outwardly from the trunk to an operable position at the rear of the trunk lid. After the cover is applied to the automobile, the containment tube is swung back to the trunk compartment for safe storage.

21 Claims, 5 Drawing Sheets

AUTOMOBILE COVER SYSTEM

CROSS REFERENCE TO RELATED APPLICATIONS

This is a continuation-in-part application of my co-pending U.S. patent application Ser. No. 07/261,037, filed Nov. 16, 1988, now abandoned, entitled: "Vehicle Cover System", which, in turn, is a continuation-in-part application of U.S. patent application Ser. No. 07/106,816, filed Oct. 13, 1987, entitled: "Remote Control Power-Assisted Vehicle Cover", now U.S. Pat. No. 4,848,823.

BACKGROUND OF THE INVENTION

The present invention relates generally to automobile covers and more particularly to covers that can easily be removed from a vehicle mounted storage and moved into a covering position around the auto. The invention also relates generally to the configuration of such covers for fitting around the vehicle which provides trouble-free retraction into a stored position within the containment tube. Still further, the invention relates to the mounting arrangement of the containment tube and the storage thereof within the trunk compartment when the cover is in use. In a further embodiment, the cover and containment tube are located within a bumper, preferably the rear bumper of the automobile.

Heretofore, it has been common to use lightweight covers of various flexible fabric materials to cover vehicle bodies for protection against the elements. Covers are often used to protect automobile paint finishes from the harmful effects of the sun and airborne dirt and smog, rain, snow and the damaging abrasive effects of windblown sand, for example. Covers are also used as a solar shield to keep the interior of the vehicle cool in hot, sunny climates. Most commonly, vehicle covers are shaped to surround the top, front, rear and sides of the car body, having an elastic band sewn around the bottom periphery thereof to permit the cover to snugly fit underneath the bumper and fender areas of the car. These prior covers are usually put on and/or removed by hand and are commonly stored in a folded condition in the trunk compartment when not in use. Needless to say, the application of such covers, particularly with lightweight nylon covers, is somewhat cumbersome and time consuming, especially for one person. It is also somewhat difficult to remove and fold the cover for compact storage within the trunk compartment.

Various devices have been proposed heretofore to provide a cover reel on which the vehicle cover is stored when not in use and unwound when the cover is to be applied to the vehicle. It is also known to employ a motorized reel to assist in winding the cover to a stored position within a cylindrical housing. Heretofore, however, such devices have been either fixed to the front or rear exterior of the vehicle and are targets of theft, or they require significant alterations to the vehicle body in order to permit the cover to operate properly. In addition, prior cover configurations are difficult to wind on a rotating reel or spool without experiencing snagging or jamming problems. These shortcomings are eliminated by the present invention.

SUMMARY OF THE INVENTION

The present invention overcomes the problems encountered in prior art vehicle cover devices by providing a containment tube which, in one preferred form, is pivotally mounted within the trunk compartment of the vehicle and is stowed within the trunk compartment. The containment tube is pivotally swung outwardly from the trunk to a second position located exterior of the trunk and the cover withdrawn from the containment tube to cover the car. The containment tube is then pivotally returned to the trunk and locked therein for security reasons. The containment tube is hollow and generally cylindrical in shape and possesses a sufficient volume to accommodate the rolled leader segment and flexible cover therein. The containment tube also has a longitudinally extending slot formed therein to permit ingress and egress of the cover and leads. The unique cover of the present invention comprises a flexible fabric of nylon, for example, having a shape to overlay the roof, front, rear and side portions of the vehicle. The cover has leading and trailing edges. The leading edge of the cover preferably has a front section of an elastic fabric, with a rigid guide wand attached thereto and is adapted to be secured to the front bumper region of the car. The side and trailing edges of the cover include a ribbon or band of elastic material sewn around the perimeter thereof to provide for a snug fit around the lower regions of the rear bumper and side fenders. A leader segment constructed of an elastic material is secured at a first end to a rotatable spool positioned within the containment tube and secured at a second end to the flexible cover at a spaced distance approximately one-quarter to one-third the cover length from the trailing edge of the cover. This configuration reduces the number of spool revolutions necessary to retract the cover into the containment tube since the cover is pulled into the tube in a doubled-over fashion until the rear section of the cover is completely retracted into the containment tube. The leader segment preferably has a cut-out portion to fit around the trunk lock mechanism when the cover is on the car and the containment tube is stowed in the trunk compartment.

The spool within the containment tube is preferably rotated by an electric motor which is powered by the vehicle battery. A remote control circuit and remote actuation device is also preferably employed to activate the motor when the cover is to be retracted and wound within the containment tube. In use, the cover is unwound from the take-up spool of the containment tube, either in a free wheeling or power assisted mode, by the user who grasps and directs the guide wand at the leading edge of the cover. The elasticized front section at the leading edge of the cover may include a cut-out portion to fit around the license plate and/or bracket at the front bumper in order to provide a convenient attachment scheme. In the installed condition, the cover is completely removed from the containment tube such that the elastic leader segment extends outwardly from the containment tube slot a distance to permit the trailing edge of the cover to be grasped and pulled rearwardly to cover both the containment tube and the rear bumper of the vehicle. When this rear portion is so fitted, the elasticized border portions at the side edges of the cover simultaneously move downwardly to slip beneath the bottom edges of the fenders along the sides of the vehicle providing a very snug and attractive appearance. The containment tube is also completely concealed by the vehicle trunk when the cover is in the installed position.

When the cover of the invention is to be removed from the vehicle, the containment tube is pivoted from the trunk. The trailing edge portion of the cover is pulled away and upwardly from the rear bumper and rear fender areas of the car and allowed to assume a position above the containment tube, i.e., in a position between the containment tube and the rear window of the vehicle. The elastic border material is sewn into the cover bottom in a manner that causes the cover to naturally gather in the area of the rear window as soon as the lower region of the cover is unhooked from the rear bumper/fender area. The leading edge of the cover is then removed from the front bumper and front fender area of the vehicle and the remote control motor switch is then activated. The containment tube is pivotally mounted such that the slot of the containment tube which receives the cover is positioned near or above the surface of the trunk lid deck so that there is minimum surface contact with the cover to decrease the chance of snagging as the cover is reeled. The heavier elasticized fabric leader material is first wound around the rotating spool of the containment tube which then guides the cover as it is reeled within the containment tube to provide virtually trouble-free reeling and storage. A safety overload or torque overload device, preferably in the form of a cyclic magnetic switching system or in the form of a spring-loaded torque plate, may be employed within the motorized drive unit in order to sense any snags which may occur during the cover take-up operation. Such unavoidable cover snags may result from the cover catching on a side mirror of the vehicle or on a door handle or the like. The torque overload device senses any increased tension on the cover and the take-up spool or senses a stoppage of rotation and immediately shuts off the motor in order to prevent overloading thereof and/or ripping of the cover. The obstruction is removed and the motor restarted to complete the winding operation. In place of the remote control system, a timer control may be employed to energize the electric motor after a given time delay to permit the operator to move to the front of the car and direct the guide wand back to the rear. When the cover is completely wound around the spool, the containment tube is pivotally moved to its stored position within the trunk compartment and the trunk lid closed and locked with the containment tube and cover safely stowed therein.

A further presently preferred embodiment of the invention contemplates mounting the containment tube within the hollow confines of a car bumper, preferably the rear bumper thereof. Such an embodiment is particularly suited for installation as original equipment at an auto plant.

DETAILED DESCRIPTION OF THE INVENTION

Figure 1:
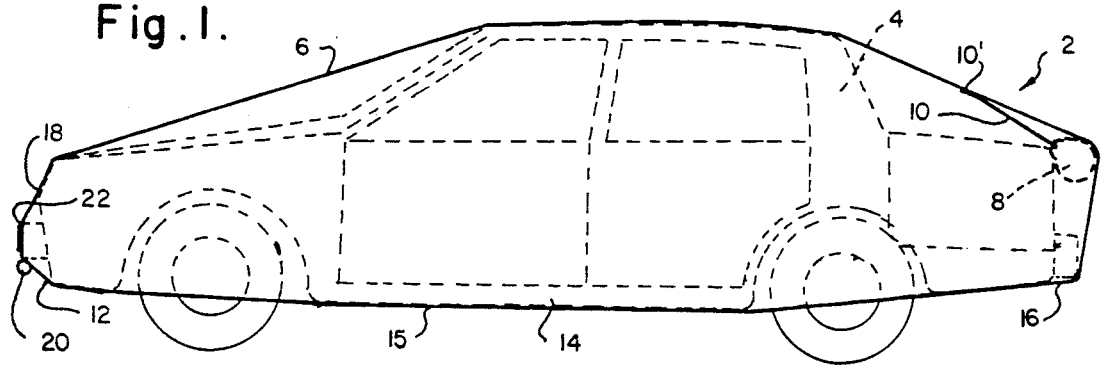
FIG. 1 is a side elevation view of an automobile with the vehicle cover system of the present invention in place thereon.
Figure 5:
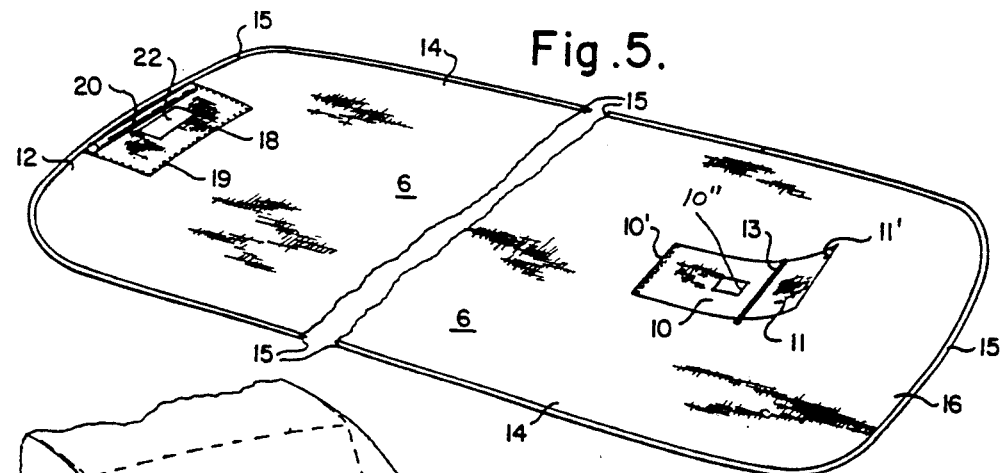
FIG. 5 is a fragmented perspective view of a presently preferred embodiment of a fabric car cover, according to the present invention.
Figure 11:
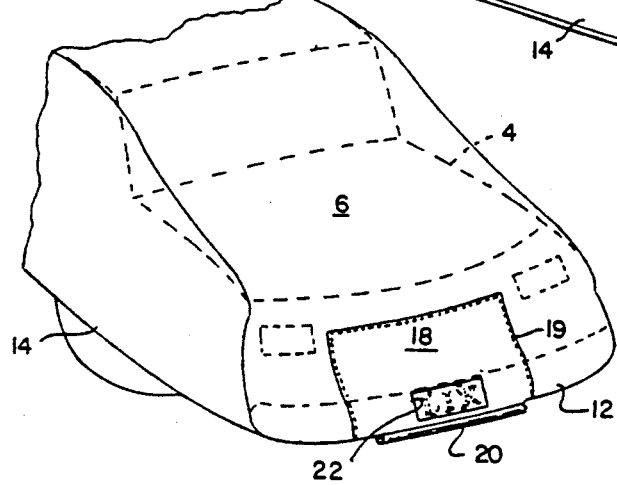
FIG. 11 is a partial perspective view of the front of the vehicle with the cover of the invention installed thereon.

Referring now to the drawings and, specifically to FIG. 1, the vehicle cover system of the present invention generally designated 2 is shown in the fully installed condition surrounding a vehicle generally designated by reference numeral 4. The cover system 2 includes a flexible cover portion 6, the details of which are shown in FIG. 5, and a containment tube 8 mounted adjacent a rearward end of the car trunk. An elasticized leader segment 10 connects the cover 6 to a rotatable spool 9 located within the containment tube 8. As shown in greater detail in FIG. 5, the elastic leader segment 10 is sewn or otherwise attached to the fabric cover 6 at an attachment area 10'. A smaller segment 11 is attached to the leader 10 by way of a zipper 13, preferably of nylon which, in turn, is connected to the spool at edge 11'. The flexible cover 6 is preferably constructed of a lightweight nylon material. A variety of synthetic and natural materials, including nylon, dacron, cotton, acetylated cotton, and blends of natural and synthetic materials may be used as the primary material for the fabric cover 6. The preferred material is nylon because of its lightweight, strength, cost, and resistance to mildew and the like. The cover 6 also is constructed of a fabric having a light color, so as to reflect the rays of the sun away from the vehicle to thus keep it cool. Due to the fact that the cover material is in intimate contact with the vehicle surface, ideally a cover with a light color on the outer side and a dark color on the inner side is preferred. In this manner, the light outer color reflects the sun away from the cover surface while the darker color on the under side absorbs heat radiated and conducted from the vehicle's surface beneath, thereby transmitting heat away from the covered vehicle's surface.

The cover 6 includes a leading edge 12 and a trailing edge 16 adapted, respectively, for placement at the front and rear bumpers. The cover also includes side edges 14 which extend between the leading and trailing edge portions on opposite sides of the vehicle. The cover 6 preferably includes a ribbon-like band of elastic border material 15, on the order of about ¼ inch wide, sewn around its perimeter. The band of elastic ribbon-like border 15 extends from the leading edge 12 around the sides 14 to the trailing edge 16 to permit the peripheral edges of the cover to fit snugly around the lower regions of the vehicle body as shown in FIG. 1.

The leading edge 12 of the fabric cover 6 also includes an elastic fabric front section 18 which extends rearwardly therefrom and is joined to the cover 6 by way of a stitched seam 19, for example. The elastic front section 18 carries a rigid, rod-shaped guide wand 20 which is fitted around a loop-like bead 52 formed at the end of section 18; see FIG. 7. A cut-out area 22 is formed within the elastic front section 18 which may conveniently fit around the front license plate bracket for securement purposes. In addition, or in place of the cut-out portion, the lower front bumper area of the vehicle 4 may be fitted with a pair of small clamps or like means for holding the wand 20 in place (not shown).

Figure 4:
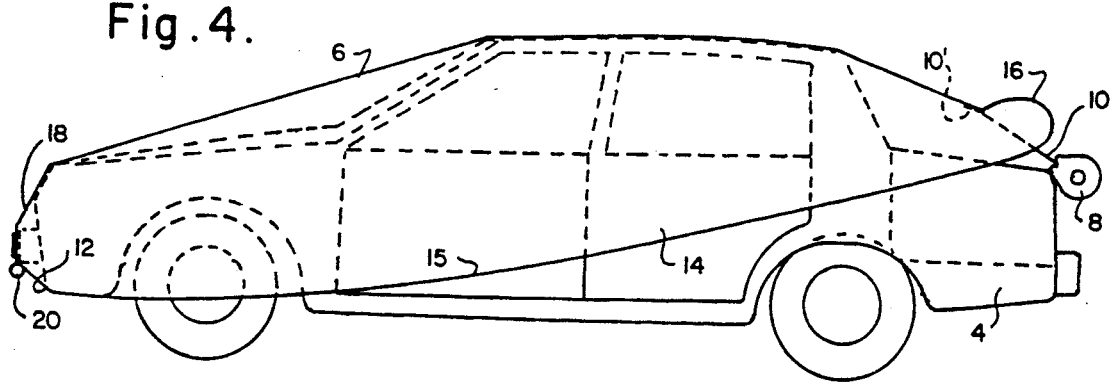
FIG. 4 is a side view of an automobile similar to FIG. 1 showing the cover system of the present invention in a partially installed position.

The cover 6 of the present invention represents a significant improvement over prior covers which are reeled into storage housings, principally due to the unique feature of the elastic leader segment 10 which joins the cover 6 to the rotatable spool 9 of the containment tube. Elastic leader 10 is, by way of example, about 24" in width, which is approximately the length of an entry slot 24 formed in the containment tube 8, FIG. 2. The leader 10 is also, for example, about 2 feet in length from the attachment seam 10' with the cover 6 to the terminal end 11', which is attached to the rotatable spool 9 of the containment tube. The location of the elastic leader segment 10 relative to the cover 6 is important and, in this regard, we prefer to place the seam 10' joining the leader segment 10 to the cover 6 approximately one-quarter to one-third the cover length from the trailing edge 16. For example, if the cover 6 has a length of approximately 16 feet from the leading edge 12 to the trailing edge 16, the leader segment 10 would preferably be affixed at 10' to the cover 6 between about 4 to 5 feet from the trailing edge 16. In this manner, an aft section of the cover 6 is defined as the section extending from seam 11' to the trailing edge 16. The aft section of the cover 6 extends rearwardly to cover the containment tube 8 and the rear trunk and bumper portions of the vehicle when the cover is in the installed position as shown in FIG. 1. Conversely, when the cover 6 is to be removed, as shown in FIG. 4, the aft section is lifted from beneath the rear fenders and bumper area of the vehicle to assume, by virtue of the elastic border 15, a position above the containment tube 8. In the position shown in FIG. 4, the side edges 14 of the cover 6 assume a posture, due to the elastic leader segment 10, extending diagonally from the area of the front bumper to a point forward of and slightly above the inlet slot 24 of the containment tube 8. When the guide wand 20, carried by elastic front portion 18 of the cover 6 is upwardly moved to disengage the front of the vehicle 4, the take-up tube is activated to reel in the leader segment 10. The cover 6 follows the leader 10 in a very neat and orderly fashion due to the high position and feeding alignment afforded by the elastic leader 10 and location of the containment tube adjacent the top of the trunk lid 5. The retraction of the cover is also facilitated since the cover is pulled into the containment tube in a doubled-over or double-layered configuration until the entire aft portion of the cover is retracted.

Figure 2:
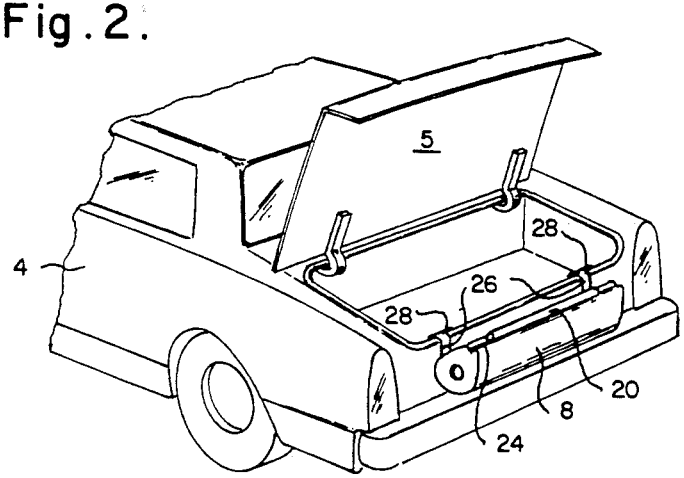
FIG. 2 is a partial perspective view of the rear portion of an automobile showing the containment tube of the present invention swung outwardly from a trunk compartment thereof.
Figure 3:
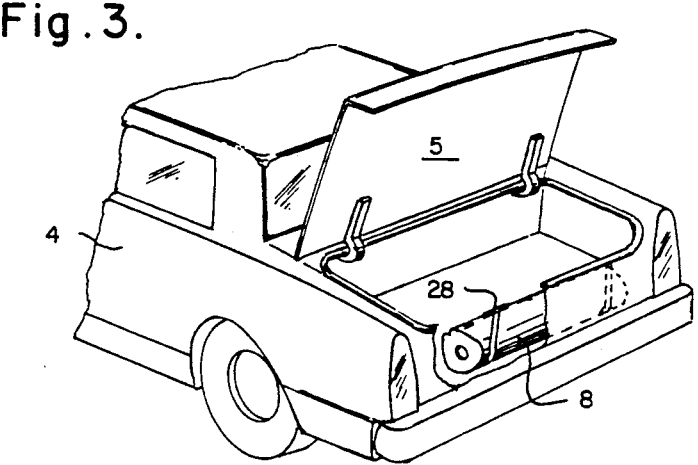
FIG. 3 is a partial perspective view similar to FIG. 2 showing the containment tube swung inwardly to a stowed position within the trunk compartment.

The containment tube 8 is fitted with a pair of spaced-apart mounting straps 26 which include hinged fittings 28. The straps 26 are adapted to be secured to a rear wall of the trunk compartment of the vehicle 4. The mounting straps 26 are preferably of a high strength stainless steel material of relatively thin gauge, for example, 0.60 inches thick to permit the trunk lid 5 to close over the straps 26 when the containment tube 8 is outside, in the operable position shown in FIGS. 1, 2 and 4. The straps may also be constructed of stainless steel mesh or plastic. After the cover 6 has been wound on a spool 9 and stored within the containment tube 8, the containment tube is pivotally swung about the hinges 28 to a stowed position within the trunk compartment, as shown in FIG. 3. The trunk lid 5 is then closed and the car cover device 2 of the invention is safely locked within the confines thereof.

The leader segment 10, as stated above, is preferably constructed of an elastic-like stretchable material, for example, the material sold under the trademark "Spandex" is particularly suitable. This same fabric is also suited for use in the front section 18. The front bumper area of the vehicle 4 may also be equipped with "C"-shaped spring clips (not shown) to engage and retain the tube-like guide wand 20 when the cover is in the extended position shown in FIGS. 1 and 4. Retention spring clips are useful for those vehicle designs which do not possess a protruding license plate bracket for engagement with open slot 22 of the front section 18.

Figure 6:
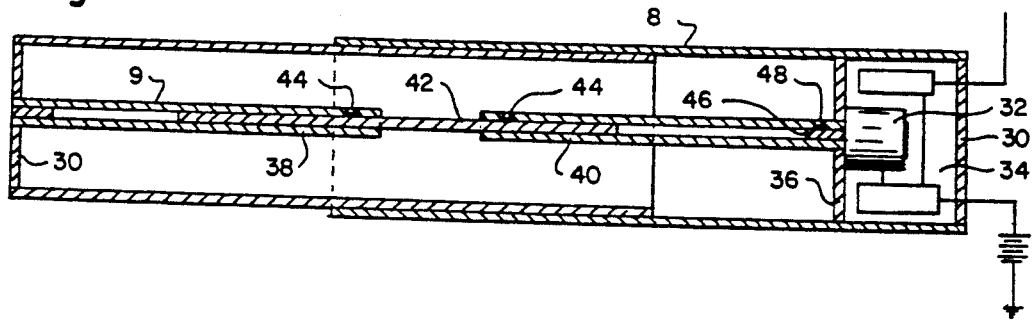
FIG. 6 is a cross-sectional side view of one embodiment of a containment tube having a motorized spool according to the present invention.

The spool 9 of the containment tube 8 can be rotated either manually, by spring tension, or by a motor assist drive. As shown in FIG. 6, the containment tube 8 and spool 9 may be constructed in a telescoping fashion with slidable nesting sections to accommodate various sizes and weights of vehicle covers. The telescoping action is but one of many various forms the containment tube 8 may take within the context of the overall invention. We prefer, however, to form the containment tube 8 as a single, unitary cylindrically-shaped hollow tube as shown in FIGS. 2 and 3. The containment tube 8 may be manufactured from either plastic or metal pipe and cut to length with the slot 24 formed through the sidewall by appropriate means along its longitudinal length. A pair of end plates 30 are secured to the ends of the containment tube 8. The take-up spool 9 is rotatably mounted preferably on bearings within the containment tube 8. As shown in FIG. 6, spool 9 may be rotatably driven by a drive motor 32. A 12 volt DC 100–150 rpm motor, having a wireless control receiver and receiver/motor interface logic and circuitry, generally indicated as 34, is connected thereto and mounted within a chamber formed between the end plate 30 and a motor mounting plate 36.

In the telescoping containment tube embodiment shown in FIG. 6, the take-up spool 9 is made up of two tubular shafts 38 and 40 mounted for rotation at their ends within stationary end plates 30 and 36. A central extension rod 42 is slidably fitted within the tubular bores of the shafts 38 and 40 to permit adjustment of the length of the containment tube 8. Set screws 44 are fitted within the tubular shafts 38 and 40 to secure the extension rod 42 therein when the desired length is established. The drive shaft tubes are preferably constructed of aluminum tubing stock while the extension rod 42 may be of a stainless steel material to provide a strong joint between the rotating members. Of course, other materials may be employed, such as high strength plastic materials for the central extension rod and tubular shafts and end plates.

The rotatable spool 9 is driven by a motor shaft 46 which extends from the motor 32 through the mounting plate 36 and into the tubular bore of the shaft member 40. A set screw 48 or like keying element engages the sidewall of the tubular shaft 40 to cause the spool 9 to rotate with the motor driven shaft 46.

The edge 11' of the elastic leader 10 is fastened to the take-up spool 9 by way of an attachment segment 11 which is connected to the main leader 10 preferably by a zipper 13, or by snaps, or by a Velcro-type fastener. Having a zipper in the attachment segment 11 permits the cover to be removed from the spool and containment tube for washing, cleaning, waterproofing and the like, or for thorough drying purposes. The attachment segment is secured to the spool 9 by either slitting the spool, inserting and fastening the end of the leader into the slit; or by using mechanical fasteners such as screws, rivets, tape, adhesive materials or the like. The attachment segment 11 may be constructed of elastic material similar to the leader segment 10, however, this is not absolutely necessary. As stated above, the width of the attachment segment 11 and the leader segment 10 are several feet in width and substantially are of the same dimension or slightly less than the length of the slot 24 formed in the containment tube 8.

Figure 7:
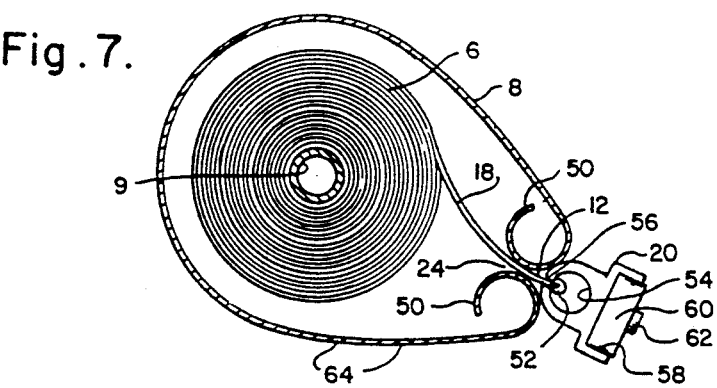
FIG. 7 is a cross-sectional end view of a presently preferred embodiment of a containment tube and guide wand of the present invention.

The cylindrical containment tube 8 may be configured in cross-section as a circle or it may assume an elongated eccentric or oval shape as shown in the cross-sectional view of FIG. 7. In this embodiment, the entry slot 24 for the cover is formed by two inwardly formed curling lips 50, which may conveniently be formed by way of an extrusion, for example.

As best seen in FIG. 7, the leading edge 12 of the front portion 18 has a bead portion 52 formed therealong, which is adapted to be fitted into a hollow interior 54 of the control wand 20. The wand 20 has a longitudinal slot 56 formed therein to permit the wand to be slid over the cover and to permit the beaded portion 52 to reside within the hollow interior 54. The diameter of beaded portion 52 is larger than the width of the slot 56 and hence, the guide wand remains attached to the end of the cover 6 by way of this interference fit. End caps are fitted at each end of the guide wand. The wand 20 also preferably contains a widened channel portion 58 which retains a remote control transmitter unit 60, preferably by a snap fit therein. The remote control unit 60 has a switch or button 62 for activating the unit and subsequently sending a signal to the radio receiving control means 70 mounted adjacent the motor 32, or other means mounted in the containment tube 8. As shown in FIG. 7, the containment tube 8 also preferably contains a plurality of spaced-apart drain holes 64 formed through a lower surface thereof to permit accumulated water from the cover 6 to drain therethrough. The drain holes 64 also permit entry of air into the containment tube to maintain the cover in a lower humidity environment within the confines of the containment tube.

Figure 8:
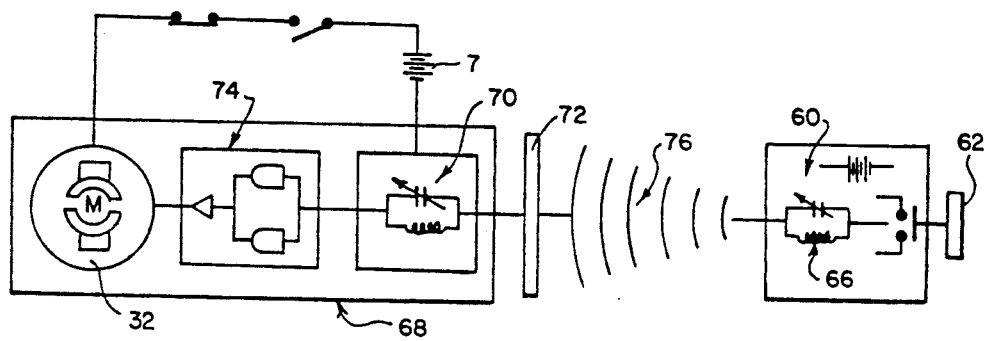
FIG. 8 is a schematic drawing of the control circuitry, useful in the present invention, including wireless remote control transmitter and receiver devices and drive motor.

FIG. 8 is a schematic showing one presently preferred embodiment of the control circuitry useful in connection with the present invention. The wireless remote control means 60 houses a switch button 62 and a radio frequency transmitter 66. A wireless receiver station 68, mounted in the containment tube 8, houses a wireless control receiver 70, with a conventional receiver antenna 72, receiver/motor interface logic circuitry 74 and the drive motor 32. Electrical power to energize the motor is supplied by a conventional vehicle battery 7. The wireless control receiver 70 is located between the motor mounting end plate 36 and the end plate 30 and is activated by a radio signal 76 transmitted from the radio frequency transmitter 66, which, as stated above, may be housed in the guide wand 20. After the cover is installed on the car, the transmitter control unit 60 is preferably unsnapped from the wand and carried by the vehicle operator so as to prevent unauthorized removal of the car cover from the vehicle. In place of a radio signal 76, ultrasonic, infrared, microwave or other transmission media could also be used as a wireless control link between the remote unit 60 and the receiver station 68.

The cover drive motor 32 is activated through a motor/receiver interface logic and circuitry housed in black box 74, which also contains a relay system which may be either solid state logic, or mechanical, to activate the motor 32. The circuitry logic is preferably designed such that the remote motor control button 62 must be depressed to permit the operation of the winding/unwinding drive motor. Limit control switches 17 may also be used to turn the motor off when the cover has reached either its fully extended, or fully retracted, positions. The circuitry is also designed such that the motor rotation may be reversible with a single button control.

Figure 9:
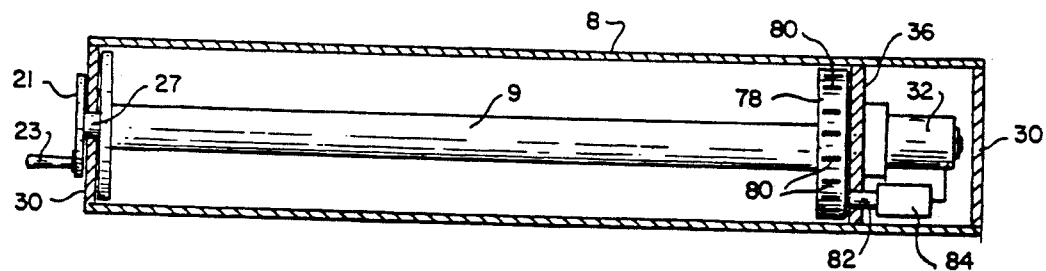
FIG. 9 is a cross-sectional side elevation view of a containment tube and motor powered spool having a magnetic field analyzer shut-off feature according to the invention.

A further motor control shut-off scheme is shown in FIG. 9 which provides a safety shut off in the event of cover snagging and functions as a torque overload device. In this presently preferred embodiment, the take-up spool 9 of the containment tube 8 has a rotatable end disc 78 attached thereto for rotation adjacent the stationary motor mounting end plate 36. The disc 78 has a plurality of permanent magnets 80 affixed around the perimeter thereof. A stationary magnetic sensor 82 is affixed to the mounting plate 36 to monitor the oscillating magnetic field created by the magnets as the spool end disc 78 rotates past the sensor. The magnetic sensor 82 is connected to a periodic magnetic field analyzer circuitry represented by black box 84 which, in turn, is wired to the motor 32. The sensor 82 continuously monitors the oscillating magnetic field generated as the magnets 80 pass in front of the sensor as the take-up spool end disc 78 rotates during a normal cover winding operation. When the spool 9 stops rotating due to a snag or when the guide wand 20 reaches the inlet slot 24, the sensor 82 immediately recognizes a cessation in the oscillating magnetic field and the solid state periodic magnetic field analyzer circuitry 84 immediately causes the motor to shut off, thus preventing an overload in the motor and/or damage to the cover 6 if it were, for example, snagged on a side mirror, door handle, or the like. Once the snag is cleared, control button 62 on the remote transmitter 60 is pressed and the motor 32 is restarted if additional winding of the cover is required. The magnetic sensor control unit is also useful for automatically stopping the motor 32 when the wand 20 reaches the tube 8 to shut the motor off at the end of the winding cycle.

The take-up spool 9 and containment tube 8 may also be equipped with a manually operated crank handle or like device to permit manual winding of the spool 9 as an alternate embodiment. Such a manual feature may also be incorporated with the motorized embodiment to provide a back-up system for winding the spool 9.

Figure 10:
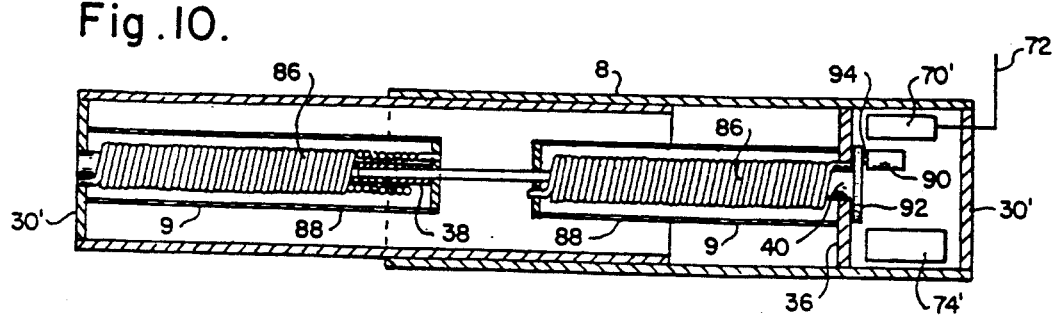
FIG. 10 is a cross-sectional view of a containment tube similar to FIG. 6, but having a spring-biased spool winding device including a remote actuation control feature.

A still further preferred embodiment of the present invention, depicted in FIG. 10, employs helical springs 86 to supply the energy to wind the cover 6 into the cylindrical containment tube 8. Naturally, in this embodiment, the previously described motor 32 is eliminated. The two helical retractive spring elements 86 are mounted around the shafts 38 and 40 of the spool 9. Respective ends of each of the helical springs 86 are mounted in a hole in the mounting end plate 30' and in the mounting plate 36'. The other ends of the springs are mounted in respective holes formed in the drive shafts 38 and 40. Each of the springs 86 are covered by a pair of protective cylindrical tubes 88. A remote controlled solenoid device 90 is situated adjacent to a plate 36' mounted within the containment tube. A circular indexing disc 92, having a spaced array of index holes formed around its perimeter is rotatably mounted through the plate 36' with a lock washer and mounting nut system. The indexing disc 92 is locked to the shaft 40 of the spool 9 and rotates therewith. When the solenoid 90 is energized, a magnetically actuated pin 94 in the solenoid is withdrawn from one of the holes in the indexing disc 92 which releases the locked spool 9 and allows the helical springs 86 to rotate the shafts 38 and 40 of the spool 9. The cover 6 is, in the embodiment of FIG. 10, manually withdrawn from the containment tube and pulled over the vehicle using the guide wand 20 to apply the fabric cover 6 over the surface of the vehicle 4. The pulling movement of the cover causes the spool 9 to rotate and thus stores the needed energy in the springs 86 as they are compressively wound by the rotating spool 9. The wound springs 86 are then locked in place after the cover has been reeled in by setting the solenoid pin 94 in one of the indexing holes in the disc 92. The solenoid 90 is activated by a radio signal sent from a remote control means and received by a wireless control receiver 70'. A receiver/motor interface logic and circuitry system 74' is also included. When the solenoid 90 is energized, the pin 94 is retracted from a hole in the indexing disc 92 to release the stored energy in springs 86 to rotate spool 9 and retract the cover 6. The guide wand 20 is used during retraction to direct the cover over the vehicle surface into the containment tube 8. The cover 6 can also be wound on the reel 9 manually as shown on the left hand portion of FIG. 9. A rotatable hand crank 21 having an outwardly extending handle 23 is situated at an end of the containment tube 8. The hand crank 21 is coupled to spool 9 by a shaft 27 to permit the spool to be rotated when the handle 23 is turned. This manual winding feature may be used alone or in combination with one of the above-described motorized or spring-biased winding embodiments.

The usefulness of this invention stems from the simplicity of its function and design and subsequent ease of manufacturing and ultimate use. The remote control feature and guide wand allows for precise control of the take-up spool winding and unwinding when extracting or retracting the vehicle cover. The covering or uncovering operations are easily accomplished with one hand, even in windy conditions. Because of the speed in which the covering or uncovering operations are performed, especially in covering, a blanket of trapped air between the cover and the car body serves to float the cover onto the vehicle.

Figure 12:
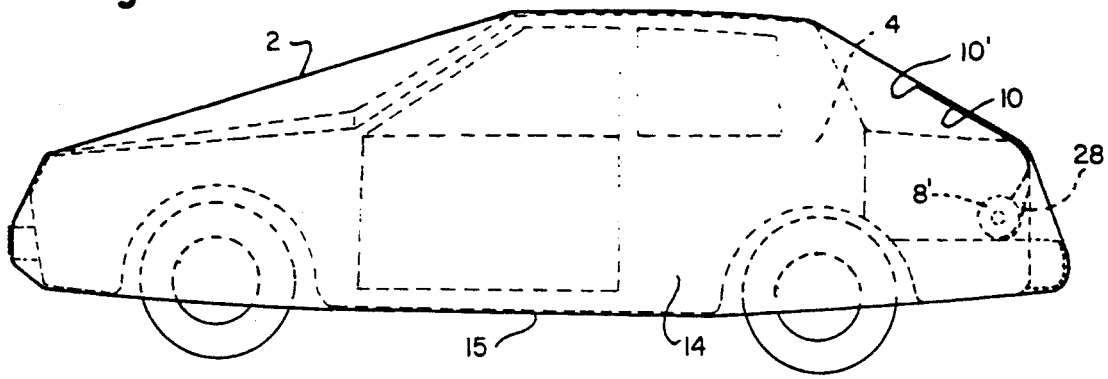
FIG. 12 is a side elevation view of an automobile similar to FIG. 1 except that the containment tube is enclosed within the trunk compartment.

One slightly modified form of the present invention is seen in FIG. 12. In this embodiment, the containment tube 8' is shown stowed in the trunk compartment when the cover 6 is positioned on the vehicle. In order to accomplish this configuration, the leader segment 10 has a greater length than the previously described embodiments of FIG. 1 so that it can extend from the connection point 10' to the containment tube 8' positioned in the trunk compartment. The leader segment 10 also has a cut-out portion 10" formed therein, FIG. 5, which is adapted to fit around the trunk locking latch when the containment tube is stowed in the trunk and the trunk lid is closed thereon as in FIG. 12. In this way, the trunk lid is permitted to properly latch without damaging the fabric of the leader segment 10.

Figure 14:
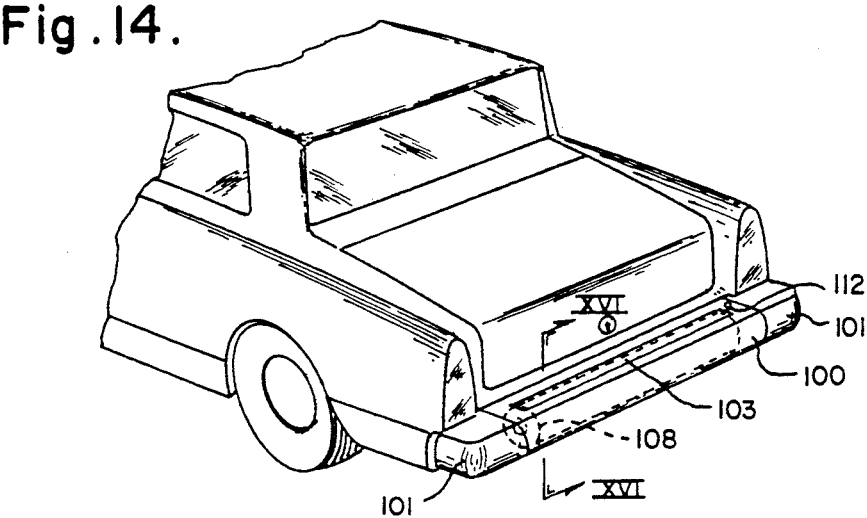
FIG. 14 is a partial fragmented view of a rear portion of an automobile showing the containment tube of the present invention mounted within the rear bumper of the automobile.
Figure 15:
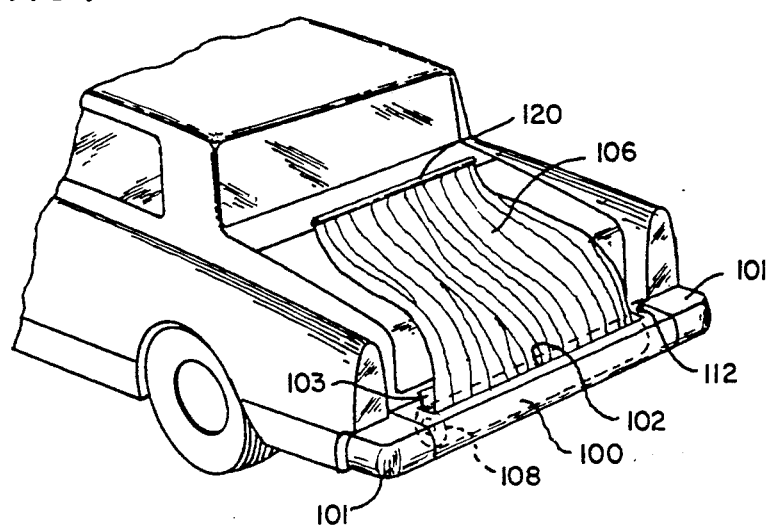
FIG. 15 is a partial fragmented view similar to FIG. 14 showing the vehicle cover partially removed.
Figure 16:
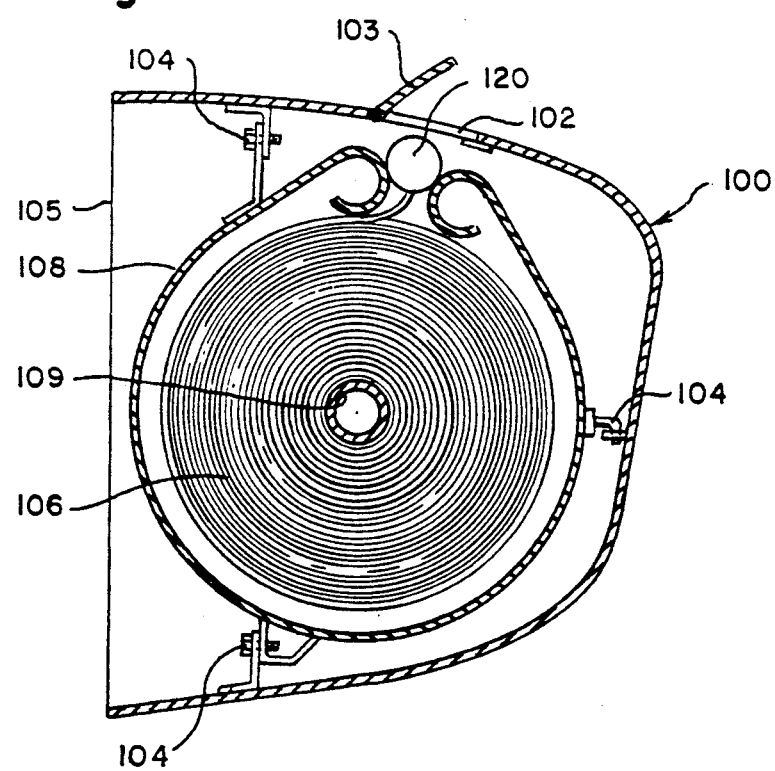
FIG. 16 is a cross-sectional end view of the rear bumper and containment tube taken along lines XVI—XVI of FIG. 14.

A further modified form of the invention is depicted in FIGS. 14-16. In this presently preferred embodiment, the containment tubes and vehicle cover of the invention are fitted within the confines of one of the vehicle bumpers, preferably the rear bumper 100. The bumper 100 has an elongated opening 102 formed in an upper surface thereof to permit the vehicle cover 106 and wand 120 to pass therethrough. The opening 102 preferably has a moveable flap 103 positioned adjacent thereto and hinged to the bumper 100 to close off the opening when the cover 106 and wand 120 are stowed within the interior of the bumper 100. Of course, other closures such as a slidable door or the like element could be employed in place of the flap 103 to close off the opening 102.

Ideally, the cover system of the invention is built into the bumper 100 at the time the new vehicle is being constructed at the auto assembly plant. While I have shown the cover 106 housed within the containment tube 108 which, in turn, is attached by fasteners 104 to the bumper, FIG. 16, it is, likewise, possible to eliminate the containment tube 108 and have the bumper 100 function in place thereof. When the containment tube 108 is employed, it may be desirable to design the bumper 100 with removable end portions 101 to provide easy access to the interior of the bumper for installation of the containment tube 108 therein. The containment tube 108 could also be installed within the bumper 100 through the open rear face 105 of the bumper (FIG. 16) prior to attachment of the bumper to the vehicle frame. These, as well as other alternative installation procedures will naturally occur to those skilled in automotive assembly art. It is also preferable in such in-bumper new vehicle installation to wire the motor 32 and related controls directly into the conventional battery powered electrical system of the vehicle. Of course, it is also understood that the in-bumper form of my invention can also be installed as a retrofit on new or used vehicles after they leave the auto assembly plant merely by replacing the existing bumper with a compatible slotted bumper of the previously described type.

Figure 13:
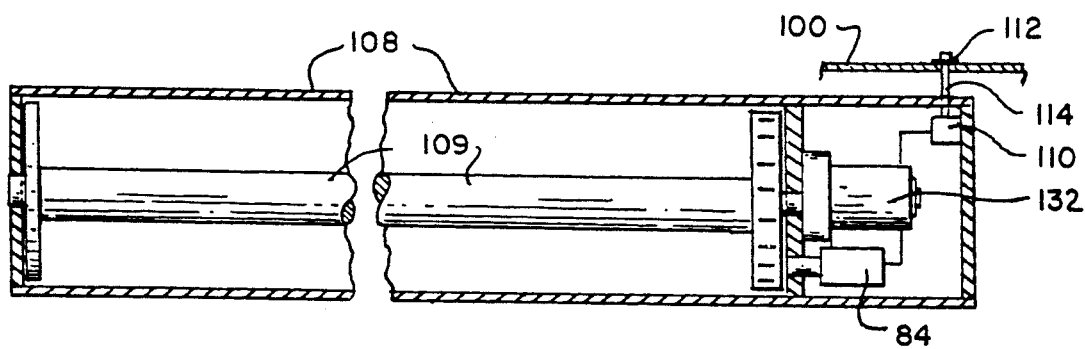
FIG. 13 is a partially fragmented, cross-sectional side view of the containment tube drive motor having a manually activated, time delay control.

Referring to FIG. 13, the present invention may also include a timer control device 110 positioned adjacent motor 131 with the containment tube 108. An activation switch 112 is mounted on an outer surface of the bumper 100 and operably connected to the timer device 110 by wiring 114 or suitable mechanical linkage. The switch 112 is preferably key actuated to prevent unauthorized starting of the motor 131. After the user/operator activates the timer control device 110, the user has sufficient time to walk to the other end of the vehicle and grasp the wand 120 prior to the activation of the motor 131 and winding reel 109 by timer 110. The cover is then "walked-in" to the in-bumper containment tube 108 as previously described. The timer control device 110 and associated activation switch 112 thus provide a less expensive power assisted alternative to the previously described remote control system of FIG. 8.

It is further contemplated that a magnetic reed switch or mechanical switch be provided on a front portion of the wand hold-down hook (not shown) which is wired into the existing security system of the automobile to prevent tampering with the cover. Of course, the cover security system may also be wired to a key-operated switch such as switch 112 in order to activate and deactivate the security system.

The transmitter control unit 60 can also be used to remotely open the vehicle trunk by using a magnetic proximity switch to sense if the cover 6 is in the containment tube 8, thereby activating the remote trunk control.

Having thus described our invention with the detail and particularity required by the Patent Laws, what is claimed and desired to be protected by Letters Patent is set forth in the following claims.

What is claimed is:

1. A cover system for an automobile comprising:
   (a) a flexible cover means having a leading edge and a spaced trailing edge defining a length therebetween and opposed side edges, said cover means of a size suitable for covering the automobile from a rear bumper to a front bumper and around the sides thereof; said cover means including a leader segment having first and second ends attached along its first end to the cover means defining an attachment area positioned substantially mid-way between said side edges and spaced from the trailing edge thereof, wherein the leader segment has a cut-out area adapted to fit around a trunk lock mechanism when said cover means is in an extended position and said containment tube is in a stowed position, said cover means including means for attaching the cover means to the automobile at the front and rear bumper areas and side areas thereof;
   (b) a containment tube having an open interior of sufficient volume to store said cover means and having a slot formed therein for passage of said cover means therethrough, said containment tube including a rotatable spool positioned therein, attached to the second end of the leader segment of the cover means;
   (c) means for rotating said spool for winding said leader segment and cover means thereon, and;
   (d) means for pivotally mounting the containment tube within a trunk portion of the automobile, wherein the containment tube is swingable to a position outside of the trunk portion for unwinding and winding in said cover means and swingable to a stored position within said trunk, whereby, in use, when the automobile is covered, the cover means extends forwardly from said containment tube to cover the front of the automobile and extends rearwardly from the attachment area of the leader segment to cover the rear of the automobile and said leader segment extends from said attachment area to the stored containment tube within the trunk.

2. The cover system of claim 1 wherein the means for attaching the cover means to the automobile includes an elastic, ribbon-like material affixed on at least said side and trailing edges thereof.

3. The cover system of claim 2 wherein the cover means includes a front section extending a distance from the leading edge thereof and constructed of an elastic-like fabric material and terminating at a forward end; a rigid guide wand attached to the forward end of said elastic front section for grasping by a user and for directing said cover over said automobile during covering and uncovering operation.

4. The cover system of claim 1 wherein the cover means is constructed of a nylon material and includes an elastic ribbon-like border material affixed on at least said side and trailing edges thereof.

5. The cover system of claim 1 wherein the means for mounting the containment tube comprises means for pivotally mounting the containment tube within a trunk compartment of the automobile whereby in a first stored position the containment tube is positioned inside the trunk compartment and in a second, operable position, the containment tube is positioned outside of the trunk compartment adapted to dispense said cover means therefrom to cover the automobile and to reel in said cover means and subsequently assume said stored position both when the cover means is covering the vehicle and when the cover means has been removed from said automobile.

6. The cover system of claim 1 wherein the means for rotating the spool includes an electric motor positioned within said containment tube and operably connected to said spool and adapted to be powered by a battery and including means for activating and de-activating said motor.

7. The cover system of claim 6 wherein the means for activating and de-activating the motor includes a remote transmitter means for sending a signal to a receiver means mounted in said containment tube.

8. The cover system of claim 1 wherein the means for rotating the spool includes spring means associated with said spool which is adapted to windably store energy when the cover means is unwound from the spool and adapted to release said stored energy to rotate said spool when said cover means is wound to a stored position.

9. The cover system of claim 8 including control means for releasing the spring means to rotate the spool when the cover means is to be wound on said spool.

10. The cover system of claim 9 wherein the spring release means includes a remote transmitter means for sending a signal to a receiver means mounted in said containment tube and operably interacting with a solenoid device for releasing said spring means upon reception of a signal from said remote transmitter means.

11. The cover system of claim 1 wherein the means for rotating the spool includes a manually turnable crank means attached to said spool, having a handle extending outwardly from an end of the containment tube for hand winding of the cover means.

12. The cover system of claim 1 wherein the attachment area of the leader and cover means is positioned between about one-quarter to one-third the length of said cover means from the trailing edge thereof.

13. The cover system of claim 1 wherein the means for rotating the spool comprises an electric motor and further includes means for sensing rotative movement of said spool during rotation thereof by the motor and for deactivating the motor when the sensing means senses a non-rotative condition.

14. The cover system of claim 13 wherein the sensing means includes a plurality of permanent magnets positioned a spaced-apart way around a rotatable disc carried by the spool at one end thereof and stationary sensor means adjacent the disc and circuitry means for sensing an oscillating magnetic field as the magnets move past the sensor means and for de-activating the motor when the sensor means detects an absence of the oscillating magnetic field.

15. A cover system for an automobile comprising:
(a) a flexible cover means having a leading edge and a spaced trailing edge defining a length therebetween and opposed side edges, said cover means of a size suitable for covering the automobile from a rear bumper to a front bumper and around the sides thereof; said cover means including a leader segment having first and second ends attached along its first end to the cover means defining an attachment area positioned substantially mid-way between said side edges and spaced from the trailing edge thereof, said cover means including means for attaching the cover means to the automobile at the front and rear bumper areas and side areas thereof and wherein the leader segment of the cover means includes means located between the first and second ends thereof to permit detachment of the leader segment and cover means from the containment tube;
(b) a containment tube having an open interior of sufficient volume to store said cover means and having a slot formed therein for passage of said cover means therethrough, said containment tube including a rotatable spool positioned therein, attached to the second end of the leader segment of the cover means;
(c) means for rotating said spool for winding said leader segment and cover means thereon; and
(d) means for pivotally mounting the containment tube within a trunk portion of the automobile, wherein the containment tube is swingable to a position outside of the trunk portion for unwinding and winding in said cover means and swingable to a stored position within said trunk, whereby, in use, when the automobile is covered, the cover means extends forwardly from said containment tube to cover the front of the automobile and extends rearwardly from the attachment area of the leader segment to cover the rear of the automobile and said leader segment extends from said attachment area to the stored containment tube within the trunk.

16. The cover system of claim 15 wherein the detachment means carried by the leader segment is a zipper.

17. In combination, an automobile and a cover system therefore comprising:
(a) a flexible cover means having a leading edge and a spaced trailing edge defining a length therebetween and opposed side edges, said cover means of a size suitable for covering the automobile from a rear bumper to a front bumper and around the sides thereof, said cover means including an elastic, ribbon-like material affixed on said edges, said cover means including a leader segment having first and second ends and attached along its first end to the cover means and defining an attachment area therealong and positioned substantially mid-way between said side edges and spaced from the trailing edge thereof, and including means for attaching the leading edge of the cover means to one of said bumpers;
(b) the other of said automobile bumpers having an open interior and having an opening formed along an outer surface thereof communicating with the bumper interior;
(c) a containment means positioned within said open bumper interior to store the cover means therein, said containment means including a rotatable spool positioned therein and attached to the second end of the leader segment of the cover means; and
(d) means for rotating the spool for winding said leader segment and cover means on the spool, wherein the spool rotation means comprises a motor having control means including a timer means adapted to be activated by a user, whereby the motor is energized when a predetermined time period elapses after said timer means is activated.

18. The cover system of claim 17 including a rigid guide wand attached to the cover means adjacent the leading edge thereof.

19. The cover system of claim 17 wherein the containment means is located in the rear bumper and wherein the cover means includes a front section extending a distance from the leading edge thereof and constructed of an elastic-like fabric material and terminating in a forward end carrying a rigid guide wand thereon, said elastic front section also having a cut-out portion adapted to fit around a bracket means at a front bumper of the automobile.

20. A cover system for an automobile comprising:
(a) a flexible cover means having a leading edge and a spaced trailing edge defining a length therebetween and opposed side edges, said cover means of a size suitable for covering the automobile from a rear bumper to a front bumper and around the sides thereof; said cover means including a leader segment having first and second ends attached along its first end to the cover means defining an attachment area positioned substantially mid-way between said side edges and spaced from the trailing edge thereof, said cover means including means for attaching the cover means to the automobile at the front and rear bumper areas and side areas thereof;
(b) a containment tube having an open interior of sufficient volume to store said cover means and having a slot formed therein or passage of said cover means therethrough, said containment tube including a rotatable spool positioned therein, attached to the second end of the leader segment of the cover means;
(c) means for rotating said spool for winding said leader segment and cover means thereon, wherein the spool rotation means comprises a motor having a control means including a timer means adapted to be activated by a user, whereby the motor is energized when a predetermined time period elapses after said timer means is activated; and
(d) means for pivotally mounting the containment tube within a trunk portion of the automobile, wherein the containment tube is swingable to a position outside of the trunk portion for unwinding and winding in said cover means and swingable to a stored position within said trunk, whereby, in use, when the automobile is covered, the cover means extends forwardly from said containment tube to cover the front of the automobile and extends rearwardly from the attachment area of the leader segment to cover the rear of the automobile and said leader segment extends from said attachment area to the stored containment tube within the trunk.

21. A cover system for an automobile comprising:
(a) a flexible cover means of a size suitable for covering the automobile;
(b) a containment tube adapted to be positioned within a bumper of the automobile, said tube having an open interior to store said cover means therein and having a slot formed therein for passage of said cover means therethrough and to an exterior portion of said bumper, said containment tube including a rotatable spool positioned therein attached to said cover means; and
(c) means for rotating the spool for winding the cover means thereon, wherein the spool rotation means comprises a motor having control means including a timer means adapted to be activated by a user, whereby the motor is energized when a predetermined time period elapses after said timer means is activated.

* * * * *